Patented Feb. 19, 1952

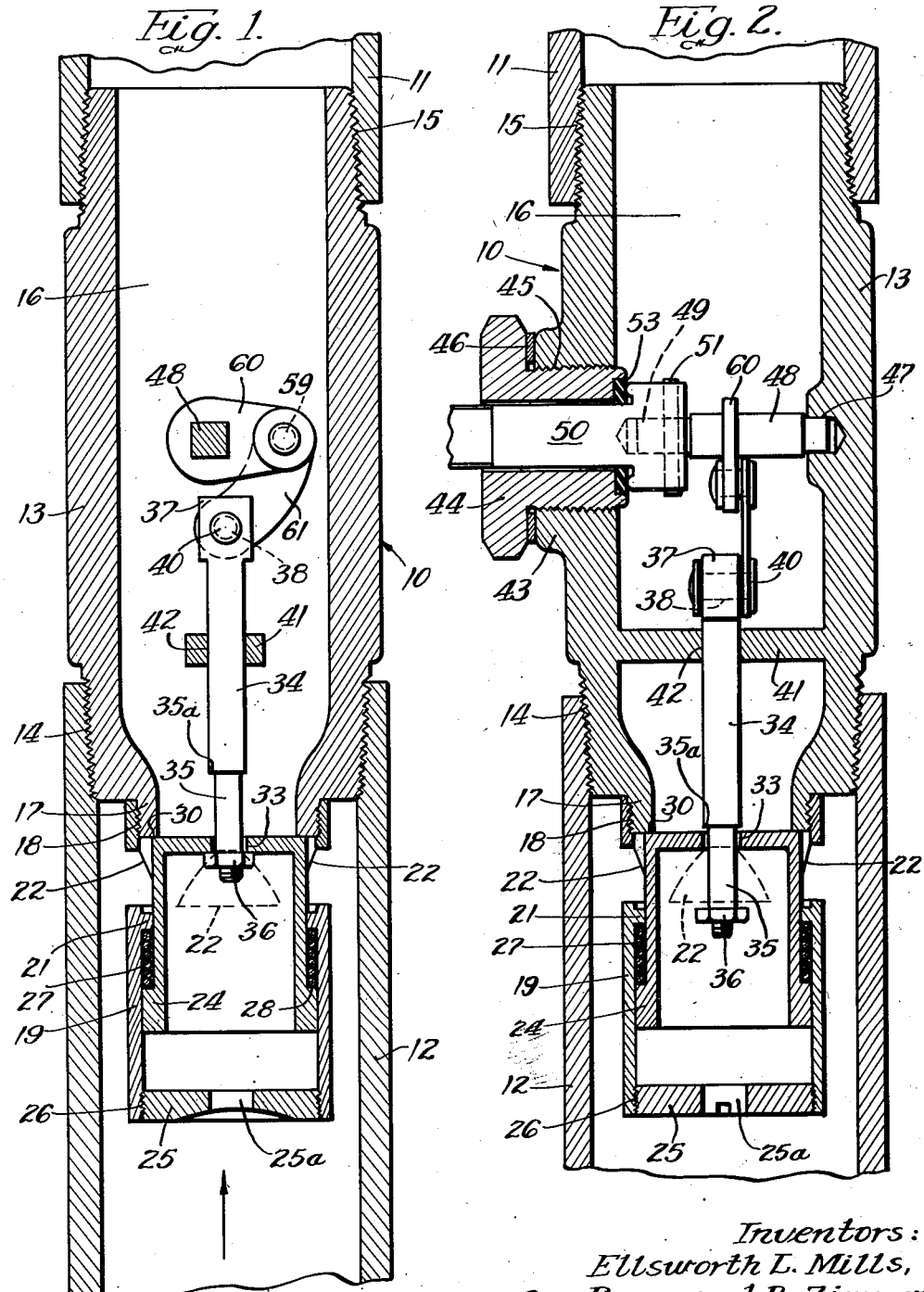

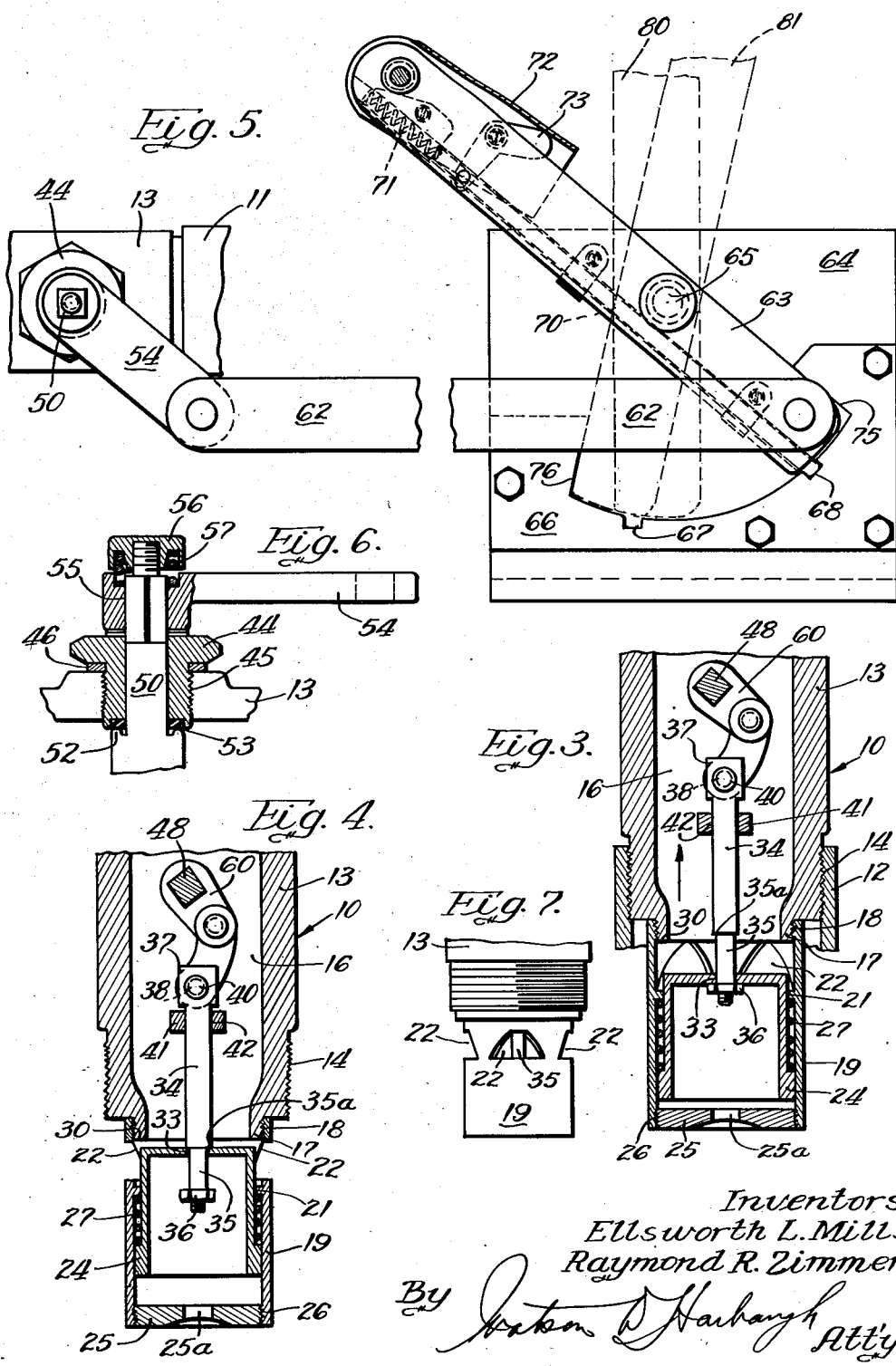

2,586,691

UNITED STATES PATENT OFFICE 2,586,691

EXCESS FLOW CHECK VALVE

Ellsworth L. Mills, Highland Park, and Raymond R. Zimmer, Chicago, Ill., assignors to The Bastian-Blessing Company, Chicago, Ill., a corporation of Illinois Application June 26, 1947, Serial No. 757,118

12 Claims. (Cl. 137—153)

This invention relates generally to check valves and more particularly to an improved excess flow check valve which, in addition to closing automatically should the rate of fluid flow through it become excessive, may be opened or closed manually.

The valve of this invention, which is intended primarily for use with liquefied petroleum gas, but may be readily adapted for other fluids, is further characterized by its being of greater sensitivity than conventional valves closing rapidly, with no possibility of hunting or vibrating, as soon as the critical rate of flow is exceeded.

The regulations imposed by the National Board of Fire Underwriters and other organizations relating to liquefied petroleum gas products such as butane and propane require that all conduits connected to storage and transfer containers be equipped with automatically closing excess flow check valves to prevent the discharge of the contents of the container in case the conduit leading from the container is broken or becomes disconnected.

Excess flow check valves are designed so that they will close and shut off the flow of fluid when the pressure on the upstream side of the valve exceeds that on the downstream side by a predetermined value or when the rate of flow through the valve exceeds a predetermined rate.

Normally, excess flow check valves are not positive shutoff valves but are purposely designed so as to leak slightly with the result that when they have been closed, pressure will gradually build up on the downstream side as fluid leaks by and allow the valve to open.

The valve of this invention can be used in conjunction with pumps for transferring liquefied petroleum gas from one container to another such as those employed to convey gas from a tank truck to a storage tank. When a conventional excess flow check valve is connected in series with such a pump in a conduit connecting two gas containers in order to transfer fluid from the one container to the other, difficulty is frequently encountered when the pump is first started, for, if the pump is of a large capacity, immediately it is started it delivers liquid to the upstream side of the excess flow check valve at a substantially high pressure compared with the zero pressure present downstream of the valve. Since these valves actually operate on pressure differential rather than rate of flow, the abnormal differential experienced when the pump is first started causes the valve to slug closed. When this occurs, a delay period of fifteen to thirty minutes must be taken until sufficient fluid has leaked past the valve through the small bleed hole provided to build up the downstream pressure so that the valve can reopen. The same inadvertent slugging described above will occur when a control valve in a line connecting a full container through a conventional excess flow check valve to an empty container is opened too rapidly.

One object of this invention therefore is to provide a valve which may be manually forced open by the operator should it slug closed under these conditions.

Another object is to provide a valve which may be manually closed and thus eliminate the necessity for providing a separate shutoff valve in the line, or allow the shutoff valve to be serviced where one is provided.

A further object is to provide an excess flow check valve which can be manually closed as a shutoff valve to form a substantially tight leakless seal, but which leaks slightly when closed automatically, rather than manually, in order that the valve will open automatically should it close and the operator fail to open it manually.

A further object is to provide a valve having a triangular shaped port closed by movement of the valve member across the port, the member moving from the base of the triangle to its apex in order to close off the port more rapidly during the initial stages of closing to eliminate the possibility of hunting and chattering or partial closing of the valve.

Other and additional objects and advantages of this invention will be apparent to those familiar with the art on reading the following specification in conjunction with the drawings and the appended claims.

In the drawings:

Fig. 1 is a vertical section of the valve of this invention installed in a conduit, the valve being shown in manually closed position.

Fig. 2 is a vertical section taken at right angles to the section of Fig. 1 showing the valve in the automatically closed position.

Fig. 3 is a section showing the valve in the normally open position.

Fig. 4 is a section showing the valve in the manually forced open position.

Fig. 5 is a view showing the operating lever and its associated linkage.

Fig. 6 is a partial section showing the method of attachment of the operating crank to the rotatable shaft.

Fig. 7 is a view showing the valve port construction.

In the various figures, like numbers refer to like parts.

The excess flow check valve 10 is shown in Figs. 1 and 2 to be installed between two vertically extending pipes 11 and 12. The pipe 12 is connected to a tank (not show) containing liquefied petroleum gas or other fluid under pressure while the pipe 11 extends to the tank (not shown) into which the fluid is to be transferred, so that the direction of fluid flow is from the pipe 12 to the pipe 11 as indicated by the arrow in Fig. 1.

Although the valve 10 is shown installed in a conduit, it may be installed directly on the tank itself, a threaded flange being provided in a wall of the tank. Furthermore, the valve 10 need not be installed in the vertical position but may be placed horizontally or inverted from the position shown. However, for greatest accuracy, a given valve must be set or adjusted for the position at which it is to be installed.

The major portion of the valve 10 is formed of an elongated hollow body 13. This body is preferably formed of cast brass and is threaded on each end as indicated at 14 and 15 for attachment to the pipes 11 and 12. A passage 16, whose lower end is of smaller diameter, extends through the body 13 from one end to the other. A projection 17 on the lower end of the body is provided with threads 18 for supporting the cylindrical valve guide 19.

The valve guide 19, preferably machined from a piece of tubing, is provided with an internal shoulder 21 and its internally threaded at each end. Four ports or openings 22 are cut through the side walls of the guide 19 at the upper end. As shown in Fig. 7, the ports 22 are triangular in shape.

The cupped shape valve member 24 is received inside of the guide 19 and retained therein by a disc-like stop 25 screwed into the threads 26. A coil spring 27 surrounds the valve member 24 and urges it downwardly bearing against the shoulder 21 and a second shoulder 28 on the member 24. Thus the member 24 is normally in the position shown in Fig. 3. The stop 25 is provided with a hole 25a therethrough to admit fluid to the space within the guide 19. To adjust the rate of flow at which the valve 10 closes, the spring 27 may be replaced by a stronger or weaker spring.

The bottom face of the projection 17 on the body 13 is machined off flat, as is the top of the memebr 24, to form a valve seat 30 against which the valve member 24 closes to form a seal.

The apparatus, as so far described includes those elements necessary to an automatically operating excess flow check valve. The following description relates to the elements which comprise the manual operation drive for manually opening and closing of the valve.

A hole 33 is drilled through the upper end of the member 24 and receives the end of the operating shaft 34. The lower portion 35 of this shaft is of sufficiently less diameter than the hole 33 to allow a small volume of fluid to flow through the space surrounding the shaft 34 when the valve is in the slugged or closed position. This space replaces the bleeder hole provided in conventional excess flow check valves, allowing fluid to leak past the valve member 24 at a slow rate in order that the valve may unseat itself in case it has accidentally been allowed to slug closed or where the valve controlling discharge is operated to provide excessive flow. The lower end of the shaft 34 is threaded and receives a nut 36 whose upper face is machined flat so as to seal the opening 33 when the member 24 rests against the nut 36.

The upper end of the shaft 34 is provided with a square head 37 which is drilled as indicated at 38 to receive a pin 40. A rib 41, integral with the body 13, extends across the passage 16, and has a vertical hole 42 drilled through it for supporting the shaft 34.

A boss 43 (Fig. 2) is provided on one side of the body 13 for supporting a threaded bushing 44. This bushing is screwed into a threaded hole 45, a seal being effected by a gasket 46. On the opposite side of the body 14 and on the same center line as the threaded hole 45, a hole 47 is drilled for supporting the end at a crank shaft 48. The other end of this shaft is supported in a hole 49 provided in another shaft 50 which extends through the bushing 44. The two shafts 48 and 50 are joined together by a pin 51.

The inner end of the shaft 50 is of larger diameter than the remainder and has a ring-like projection 52 machined thereon. This projection bears against an annular ring 53 of elastic material carried by the bushing 44 and seals the shaft 50 to the bushing 44.

The outer end of the shaft 50, as shown in Fig. 6, is machined square to receive a crank arm 54 having a square hole 55. The hole 55 is slightly larger than the end of the shaft 50 so that the arm 54 is slidable with respect to the shaft 50. A nut 56 carried by the end of the shaft 50 supports a spring 57 which bears against the arm 54 to tend to pull the shaft 50 outwardly and effect a tight seal between the gasket 53 and the annular projection or seat 52, any pressure present in the passage 16 augmenting the spring pressure to increase the efficiency of the seal.

The shaft 48, whose center portion is square in cross section, carries a crank 60 rigidly attached thereto as shown in Fig. 1. A link 61 is attached to the end of the crank 60 by a pin 59 and also to the end of the shaft 34 by another pin 40. Thus rotary motion of the shaft 50 is transformed to longitudinal motion of the operating shaft 34.

The end of the arm 54 as shown in Fig. 5 is pinned to a bar 62 whose other end is pinned to the end of a hand lever 63 mounted for rotation on a plate 64.

A fulcrum pin 65 passes through the lever 63 and is secured to the rigidly mounted plate 64. A second plate 66 is bolted to the plate 64 and has a pair of slots 67 and 68 cut into it. The top edge of the plate 66, as viewed in Fig. 5, is cut out along an arcuate line having its center at the fulcrum of the lever 63. The slots 67 and 68 are cut into this curved edge. A rod 70, attached to the handle 63, is urged downwardly by a spring 71. A handle 72 pivoted on the end of the lever 63 is linked to the rod 70 by a lever 73 so that when the handle 72 is squeezed inwardly toward the lever 63, the rod 70 will be drawn upwardly into the lever 63, and when the handle 72 is released, the end of the rod 70 will tend to project beyond the end of the lever 63.

Thus the lever 63 may be locked in either of two positions when the end of the rod 68 is allowed to protrude into either of the slots 67 or 68, it being necessary to squeeze the handle 73 in order to move the handle 63 from either of the locked positions.

The ends of the cutout portion of the plate 65 serve as stops 75 and 76. The stop 75 limits movement of the lever 63 beyond the locked position when the rod 70 is inserted in the slot 68, but the stop 76 allows the lever 63 to be moved slightly beyond the position of the slot 67. Thus the lever 63 may be locked in either of two positions or moved to a third position as limited by the stop 76. The handle 63 is shown in the manually closed position.

The operation of this device is as follows: Assume that the handle 63 has been moved to the position indicated at 80 in Fig. 5. The valve 10 is now in the normal open position, the various internal members being positioned as shown in Fig. 3. If fluid is flowing through the valve 10 at a rate below the critical value, the valve member 24 remains in the position shown, being held in this position by the spring 27. The fluid flows through the pipe 12 and into the annular space formed between the valve guide 19 and the pipe wall. From this space the fluid passes inwardly through the triangular holes 22 into the passage 16 within the body 13 from which it flows into the pipe 11.

As the rate of flow through the valve 10 increases, the pressure differential between the pressure upstream of the valve and that downstream caused by friction of the fluid in flowing through the valve also increases. As soon as this pressure differential is sufficiently great, the upstream pressure acting on the bottom side of the valve member 24 through the hole 25a in the disc 25 is sufficient to overcome the force of the spring 27 and move the valve member 24 upwardly. As soon as this member moves upwardly its top edge closes off a portion of each of the triangular holes 22, restricting the flow through the valve 10. This increased restriction causes the pressure differential to become greater so that the valve member moves farther upwardly closing the ports 22 further. Thus the instant the pressure differential exceeds the critical value, the valve member moves rapidly to the fully closed position as shown in Fig. 2 and remains in this position.

The triangular ports 22 have been found to have particular advantages over the conventional round or other shape ports. By employing triangular ports, the rate of closing of the ports is greatest at the start of the valve member's movement so that the pressure differential across the valve 10 is immediately increased substantially; the rate of increase being greater than the increase in the force required to compress the spring 27. Thus once the valve member 24 starts to move upwardly, it closes completely and will not hunt or chatter as it seeks to come to an equilibrium position balancing pressure differential against spring compression as may be the case when nontriangular ports are employed.

When the valve 10 has closed, the member 24 rests against the valve seat 30 on the bottom of the body 13 and forms a tight seal. However, fluid still may pass through the opening between the shaft 34 and the sides of the hole 33 in the top of the member 24. Thus, if the valve 10 has closed and the conduit downstream of the valve 10 is closed, fluid leaking past the member 24 eventually builds up sufficient pressure downstream of the valve 10 so that the pressure differential is no longer greater than the force of the spring 27 and the valve member 24 will be forced back to its original position. However, as has been pointed out, this procedure requires considerable time, particularly when the pipe 11 is of great length.

In the event that the valve 10 has slugged closed and it is desired to quickly open the valve 10, the operator need only move the handle 63 to the position indicated at 81 in Fig. 5. When this is done the internal parts assume the positions shown in Fig. 4. The shaft 48 is rotated slightly in the clockwise direction from the position shown in Fig. 3, carrying the crank 60 with it. This forces the member 34 downwardly, the shoulder 35a bearing against the top of the valve member 24 and forcing it away from its seat 30. As soon as this is done, fluid flows freely past the valve member 24 and quickly builds up sufficient pressure downstream to allow the member 24 to be returned to its fully opened position by the spring 27. When the member 24 has returned to the open position the handle 63 may be returned to the position indicated at 80 and the valve 10 will remain open.

When it is desired to employ the valve 10 as a shutoff valve, the handle 63 is thrown to the position shown in solid lines in Fig. 5. This causes the shaft 48 and crank 60 to rotate to the position shown in Fig. 1, moving the operating shaft 34 upwardly. The nut 36 on the end of this shaft draws the member 24 upwardly until it strikes the seat 30 to close the valve. The bleed opening between the shaft 34 and the sides of the hole 33 is effectively sealed by the nut 36 so that the valve 10 is sealed against leakage, fluid pressure aiding in the sealing by forcing the nut 36 and member 24 against their respective seats. In some instances it has proved desirable to employ a rubber gasket or washer on the upper face of the nut 36 in order to improve the tightness of the seal.

After the valve 10 has been manually closed in this manner, in order to open it against pressure the handle 63 must be moved to the position indicated at 81. If the handle 63 is moved to the position 80, the valve will open slowly, for considerable time is required for sufficient pressure to bleed past the valve to allow it to open automatically.

The plate 66 (Fig. 5) is purposely provided with only two locking slots 67 and 68. No slot is provided to permit the handle 63 to be locked in the manually opened position indicated at 81, for it would be unsafe practice to enable an operator to lock the valve 10 in the open position.

Various changes or modifications such as the provision of an elastic valve seat or disc for the member 20 to form a better seal, or the substitution of a simple handle provided with locking detents directly on the valve body 13 eliminating the linkage shown in Fig. 5 and others which will be apparent to those familiar with the art may be made in the embodiment illustrated without departing from the spirit of this invention whose scope is defined by the appended claims.

What is claimed is:

1. In an excess flow check valve the combination including a hollow cylinder, a plurality of triangular shaped valve ports for the passage of fluid through the walls of said cylinder, a valve seat adjacent said valve ports disposed on a plane transverse to the axis of said cylinder, a valve member movably mounted in said cylinder for closing said ports and sealing against said seat when in one position, said member being so disposed as to be subjected to the force of the flowing fluid, a spring for urging said member to a second position, said spring being so formed as to yield when the force of the flowing fluid exceeds a predetermined value, and means for conducting an annular stream of fluid to said ports outside of said cylinder, said ports having the base portions of the triangles disposed so that motion of said member from said second position in the direction of said first mentioned position closes off the base portion of said ports first finally closing off the apexes of the triangular ports.

2. In an excess flow check valve the combination including a hollow cylinder, a triangular shaped valve port for the passage of fluid through the wall of said cylinder, a valve seat adjacent said valve port disposed on a plane transverse to the axis of said cylinder, a valve member movably mounted in said cylinder for closing said port and sealing against said seat when in one position, said valve member being disposed in the path of the moving fluid so as to be subjected to the force thereof, a spring for urging said member to a second position, said spring being of such size as to yield permitting the valve member to close when the flowing fluid exerts a predetermined force thereon, and means for conducting a stream of fluid to said port, said port having the widest portion disposed remote from said seat so that motion of said member from said second position toward said seat closes off said widest portion of said port first.

3. In an excess flow check valve the combination including a hollow cylinder, a plurality of triangular shaped valve ports for the passage of fluid through the walls of said cylinder, a valve member movably mounted in said cylinder for closing said ports when in one position and disposed in the path of the flowing fluid so as to close in the direction of fluid flow, a spring for urging said member to a second position, said spring being of such size as to yield under the pressure of fluid flowing above a predetermined rate, and means for conducting an annular stream of fluid to said ports outside of said cylinder, said ports having the base portions of the triangles disposed so that motion of said member from said second position toward said valve seat closes off the base portion of said ports first finally closing off the apexes of the triangular ports.

4. In an excess flow check valve the combination including a movable valve member positioned according to the differential in pressure across said valve, resilient means for holding said valve open adapted to yield and allow said valve to close when the differential pressure exceeds a predetermined value, a cylindrical guide member surrounding said valve member, and a plurality of valve ports opening through said guide member and adapted to be closed off by said valve member as it moves from an open position to a closed position, said valve ports being substantially triangular in shape so that the rate of closing of said ports is at a maximum as said valve member starts to close, decreasing as said ports are closed.

5. In an excess flow check valve the combination including a movable valve member positioned according to the differential in pressure across said valve, a cylindrical guide member surrounding said valve member, a plurality of valve ports opening through said guide member and adapted to be closed off by said valve member as it moves from an open position to a closed position, said valve ports being substantially triangular in shape so that the rate of closing of said ports is at a maximum as said valve member starts to close, decreasing as said ports are closed, and a spring for urging said valve member towards said open position, said spring being of such size as to yield under fluid pressure permitting the valve to close when the rate of fluid flow exceeds a certain value.

6. In an excess flow check valve the combination including a movable valve member, a cylindrical guide member surrounding said valve member, a valve port opening through said guide member and adapted to be closed off by said valve member as it moves from an open position to a closed position, said valve port having one end wider than the other end so that the rate of closing of said port is at a maximum as said valve member starts to close, decreasing as said ports are closed, and a spring for urging said valve member towards said open position, said spring being of such size as to yield under fluid pressure permitting the valve to close when the rate of fluid flow exceeds a certain value.

7. An excess flow check valve comprising an elongated body having a passage therethrough, a valve seat at one end of said body, a cylindrical valve guide attached to said body and surrounding said seat, a movable valve member disposed within said valve guide and closing in the direction of fluid flow, a spring for urging said valve member away from said valve seat, said spring being so formed as to yield when the force exerted by fluid flowing past said member exceeds a predetermined value, and a plurality of valve ports opening through the walls of said valve guide and adapted to be closed by said valve member, means for positioning said valve member including a reciprocable shaft mounted in said body, means on said shaft for engaging said valve member so constructed and arranged that in one position said shaft positively holds said member away from said seat and in another position said shaft positively holds said member adjacent said seat.

8. An excess flow check valve the combination including a body having a passage therethrough, a valve seat at one end of said body, a movable valve member disposed to cooperate with said seat, a spring for urging said valve member away from said valve seat, means for positioning said valve member including a reciprocable shaft mounted within said body, means on said shaft for engaging said valve member so constructed and arranged that in one position said shaft positively holds said member away from said seat and in another position said shaft positively holds said member adjacent said seat, said valve member being movable independently of said shaft and said spring being of such strength as to permit said valve member to move into contact with said seat when the pressure thereon due to the flowing fluid exceeds a predetermined value.

9. An excess flow check valve comprising an elongated body having a passage therethrough, a valve seat at one end of said body, a cylindrical valve guide attached to said body and surrounding said seat, a movable valve member disposed within said valve guide, a spring for urging said valve member away from said valve seat, and a plurality of valve ports opening through the walls of said valve guide and adapted to be closed by said valve member, means for manually positioning said valve member including a reciprocable shaft mounted in said body, means on said shaft for engaging said valve member with substantial lost motion so constructed and arranged that in one position said shaft positively holds said member away from said seat, and in another position said shaft positively holds said member adjacent said seat, and in a third position said valve member may move independently of said shaft to open or close according to the pressure differential developed by fluid flowing through said ports, said spring being of such strength as to yield and permit said valve member to move against said seat when the pressure differential between the upstream and the downstream side of the valve exceeds a predetermined value.

10. An excess flow check valve comprising an elongated body having a passage therethrough, a valve seat at one end of said body, a cylindrical valve guide attached to said body and surrounding said seat, a movable valve member disposed within said valve guide, a spring for urging said valve member away from said valve seat, and a plurality of triangular shaped valve ports opening through the walls of said valve guide and adapted to be closed by said valve member, means for manually positioning said valve member including a reciprocable shaft mounted in said body, means on said shaft for engaging said valve member with substantial lost motion so constructed and arranged that in one position said valve member may move independently of said shaft to open or close according to the pressure differential developed by fluid flowing through said ports, said ports being disposed so that said valve member in moving toward said seat closes off the base portions of said triangular ports, said spring being of such strength as to yield and permit said valve member to move against said seat when the pressure differential between the upstream and the downstream side of the valve exceeds a predetermined value, and first and finally the apex portions.

11. In an excess flow check valve the combination including an element having a plurality of ports therein, a second element cooperating with the first element to close said ports, one of said elements being movably mounted with respect to the other element and being disposed in the path of fluid flowing to said ports, the movable element being subjected to the pressure of fluid upstream of said ports, and resilient means for urging the movable element against the force of flowing fluid to open said ports, said ports being so shaped that the rate of closing thereof increases more rapidly than the rate of movement of the movable element.

12. In an excess flow check valve the combination including an element having a port therein, a second element cooperating with the first element to close said port, one of said elements being movably mounted with respect to the other element, the movable element being subjected to the pressure of fluid upstream of said port, and resilient means for urging the movable element against the force of flowing fluid to open said port, said port being so shaped that the rate of closing thereof increases more rapidly than the rate of movement of the movable element as the movable element moves to close the port.

ELLSWORTH L. MILLS.
RAYMOND R. ZIMMER.

REFERENCES CITED

The following references are of record in the file of this patent:

UNITED STATES PATENTS

| Number | Name | Date |
|---|---|---|
| 657,707 | Reese | Sept. 11, 1900 |
| 727,484 | Strnad | May 6, 1903 |
| 1,039,520 | Graetz | Sept. 24, 1912 |
| 1,123,123 | Grabler | Dec. 29, 1914 |
| 1,142,219 | Ziegler | June 8, 1915 |
| 1,492,980 | Hodges | May 6, 1924 |
| 1,545,821 | Eubanks | July 14, 1925 |
| 1,919,955 | Leech | July 25, 1933 |
| 2,307,949 | Phillips | Jan. 12, 1943 |

FOREIGN PATENTS

| Number | Country | Date |
|---|---|---|
| 490,008 | France | of 1918 |
| 778,928 | France | of 1935 |